UNITED STATES PATENT OFFICE.

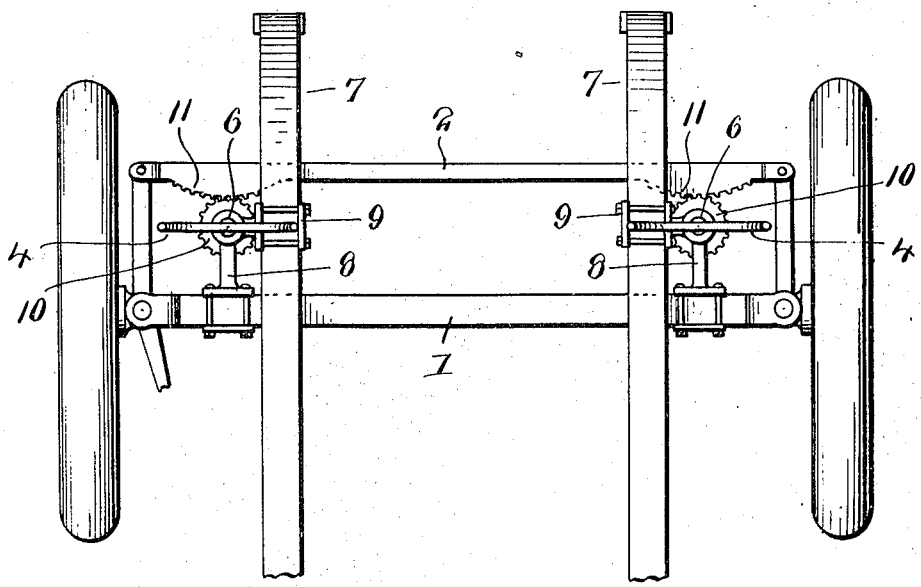
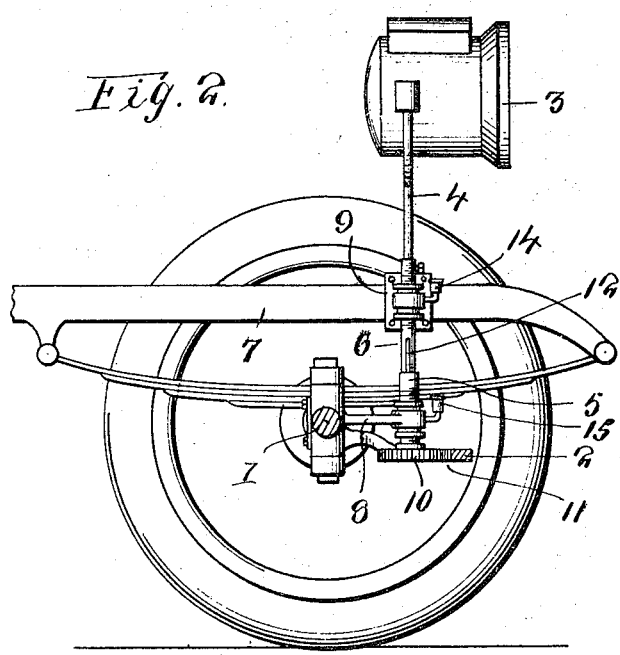
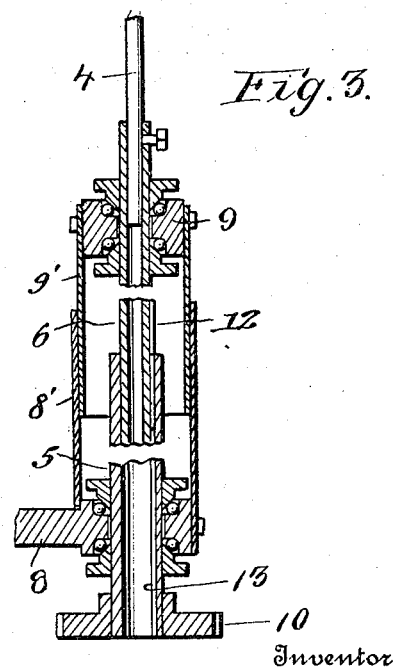

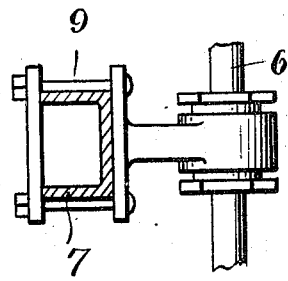
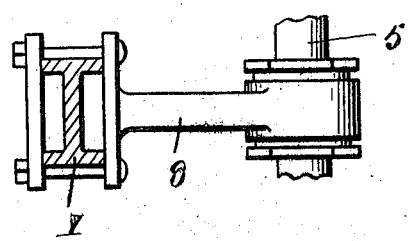
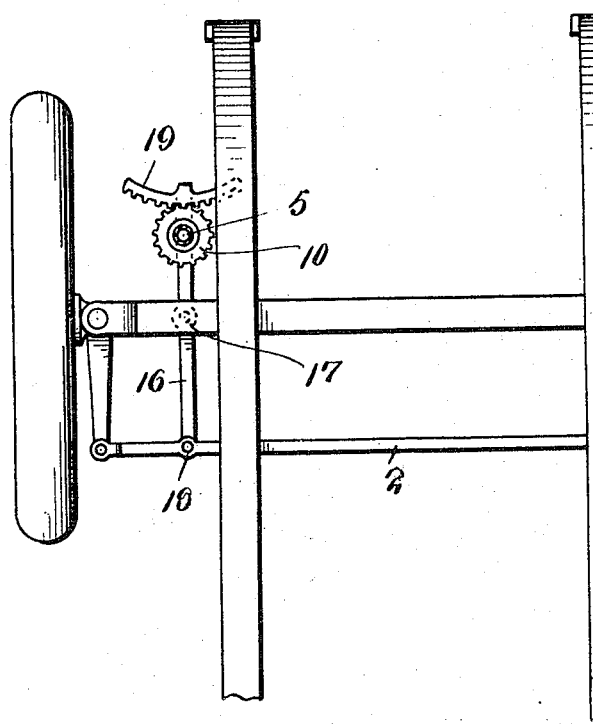
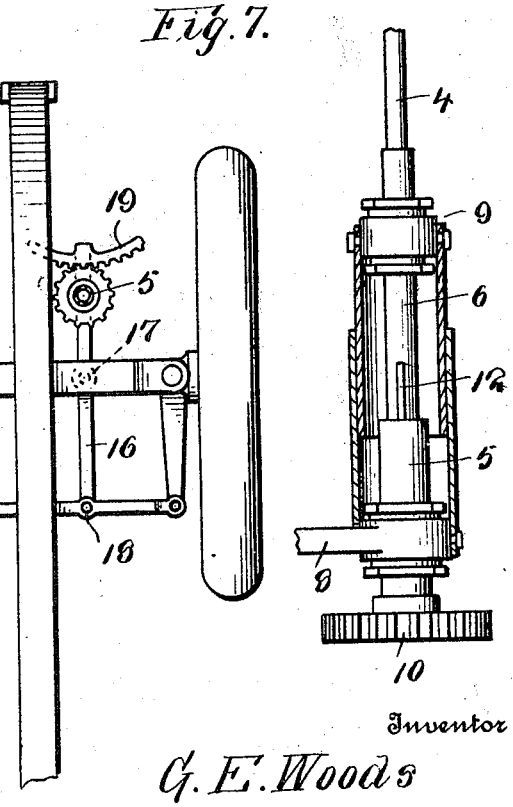

GEORGE E. WOODS, OF BILLINGS, MONTANA.

AUTOMOBILE HEAD-LAMP CONTROL.

1,134,801.      Specification of Letters Patent.      Patented Apr. 6, 1915.

Application filed October 14, 1913. Serial No. 795,161.

*To all whom it may concern:*

Be it known that I, GEORGE E. WOODS, a citizen of the United States, residing at Billings, in the county of Yellowstone and State of Montana, have invented new and useful Improvements in Automobile Head-Lamp Controls, of which the following is a specification.

This invention relates to automobile head lamp controls, the object in view being to provide simple and reliable mechanism whereby the head lamps of an automobile or like vehicle will be automatically turned simultaneously with the steering wheels so as to direct the rays of light from the lamps along the path to be followed by the machine as it is steered or turned to one side or the other.

A further object of the invention is to provide mechanism of the character referred to which may be readily applied to almost any automobile now in use or on the market and which will compensate for varying distances between the chassis and springs and the rod which connects the arms of the steering knuckles and which will also accommodate the up and down movements of the body of the machine and the springs relatively to the front axle and said rod.

With the above and other objects in view, the invention consists in the construction, combination and arrangement of parts, as will hereinafter be more fully described, illustrated and claimed.

In the accompanying drawings:—Figure 1 is a plan view of a sufficient portion of an automobile to illustrate the application of the present invention thereto. Fig. 2 is a side elevation of the same with the adjacent wheel removed. Fig. 3 is an enlarged vertical longitudinal section showing the lamp post and the telescopic socket therefor. Fig. 4 is a detail view of the clip connecting the socket to the spring. Fig. 5 is a detail view of the bracket arm which supports the lamp post socket. Fig. 6 is a plan view similar to Fig. 1 showing the manner of working the lamps from a connecting rod arranged in rear of the front axle. Fig. 7 is a sectional view of the telescopic lamp post housing with the post in elevation.

Referring to the drawings 1 designates the front axle of an automobile, 2 the rod which connects the arms of the steering knuckles, and 3 the head lamps, the parts above referred to being constructed and arranged in the usual manner.

In carrying out the present invention, each of the lamps 3 is mounted at the upper end on a downwardly extending lamp post 4 which is substantially vertical and the lower end portion of which is received in a lamp post socket of telescopic construction, said lamp post socket embodying a lower stationary section 5 and an upper slidable section 6 which is mounted to slide up and down in the lower section 5 for the purpose of accommodating the action of the springs 7 which are interposed between the axle and the body of the machine. Both of the socket sections 5 and 6 are tubular and in the preferred embodiment of this invention the lower section 5 is of sufficiently larger diameter than the section 6 to slidingly receive the last named section, while the section 6 is of sufficient internal diameter to receive and hold the lamp post 4. It will be understood that two of such lamp post sockets are employed and arranged one at each side of the machine immediately adjacent to one of the body supporting springs 7. The lower section 5 of each socket is carried by the projecting end of a supporting bracket arm 8 attached at one end to the axle 1 in rigid relation to the latter as shown. The section 5 of the socket which is fixedly connected to said bracket arm 8 is thus held stationary with respect to the axle of the machine. The upper section 6 of the telescopic socket is connected by means of a clip 9 to the upper portion of the adjacent spring 7 so as to rise and fall therewith in the up and down movements of the body. Therefore, the upper section 6 of the lamp post socket has a fixed relation to the upper part of the adjacent spring 7. While the two sections of the lamp post socket are thus fixedly connected to the parts referred to, said sections are adapted to play vertically with respect to each other by the sliding of the upper section into the lower section. The lower section 5 is adapted to turn on its longitudinal axis and in order to turn said lower section, the latter is provided with a pinion 10 which meshes with and is actuated by a series of rack teeth 11 on the connecting rod 2 above referred to. When the rod 2 is moved lengthwise, the teeth 11 engage the pinion 10 and serve to turn both sections of the lamp post socket and also the lamp post and the lamp carried thereby.

The upper section 6 of each lamp post socket is provided with a longitudinal rib or key 12 at one side thereof while the lower section 5 is provided with a corresponding groove 13 within the same to slidingly receive the rib or key 12 thus causing both sections 5 and 6 of the lamp post socket to turn together while not interfering with the relative sliding movement of said sections.

14 and 15 designate oil cups for feeding lubricant to the interior of the lamp post socket sections 5 and 6.

The construction above described refers to a machine in which the connecting rod 2 is located in advance of the axle 1. Where said rod 2 is located in rear of the axle as shown in Fig. 6, I will employ levers 16 fulcrumed at 17 on the axle and having a jointed connection at 18 with the connecting rod 2. At their forward ends, in advance of the axle, each of said levers 16 will be provided with a sector 19 to mesh with one of the pinions 10 on the lower end of the lamp post socket, the operation otherwise being the same as that illustrated and described in connection with the other figures on the drawings.

By reason of the telescopic construction of each of the lamp post sockets, a wide range of adjustment is obtained which admits of the device being attached or applied to automobiles of widely varying distances between the axle 1 and the top of the body supporting springs 7. The relative sliding movement of the upper and lower sections of the telescopic lamp post socket does not interfere with the simultaneous turning of both sections as they are keyed together in the manner shown and described. The construction also permits the lamps to be adjusted vertically as the posts 4 may be set at any desired depth into the upper sections 6 of the telescopic sockets.

Telescopic housing tubes 8' and 9' are fastened at their opposite ends to the supporting members 8 and 9, respectively, thereby closing in the sliding members of the telescopic lamp post and retaining the lubricating oil from the cups referred to and also excluding foreign matter. This keeps the working parts of the telescopic lamp post in good working condition at all times.

What I claim is:—

In an automobile headlight control, a telescopic lamp post socket embodying a lower tubular section and an upper tubular section slidable within said lower section, means for supporting said lower section in fixed relation to the axle, means for supporting the upper section of the socket in fixed relation to one of the body supporting springs, telescopic housing tubes for said telescopic posts attached to said upper and lower supporting means, and means connecting one of the socket sections with the steering mechanism whereby it is turned in unison therewith.

In testimony whereof I affix my signature in presence of two witnesses.

GEORGE E. WOODS.

Witnesses:
EDMUND NICHOLS,
WM. WOODS.